Aug. 23, 1966        R. A. SCHOPPMAN ET AL        3,268,703
                        BRAZING TOOL
Original Filed Oct. 22, 1962                2 Sheets-Sheet 2
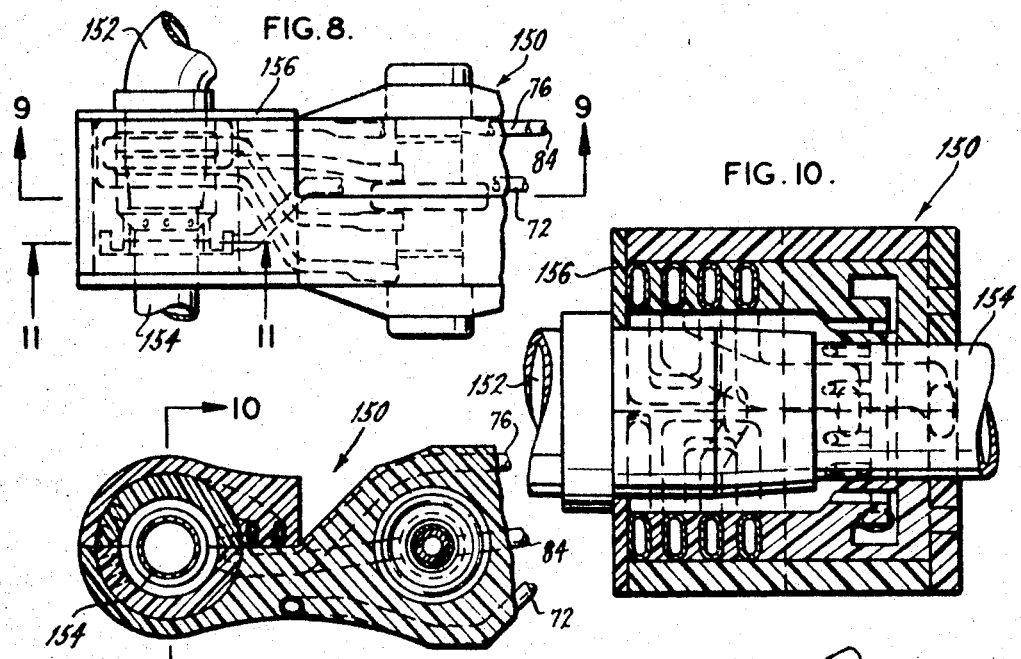
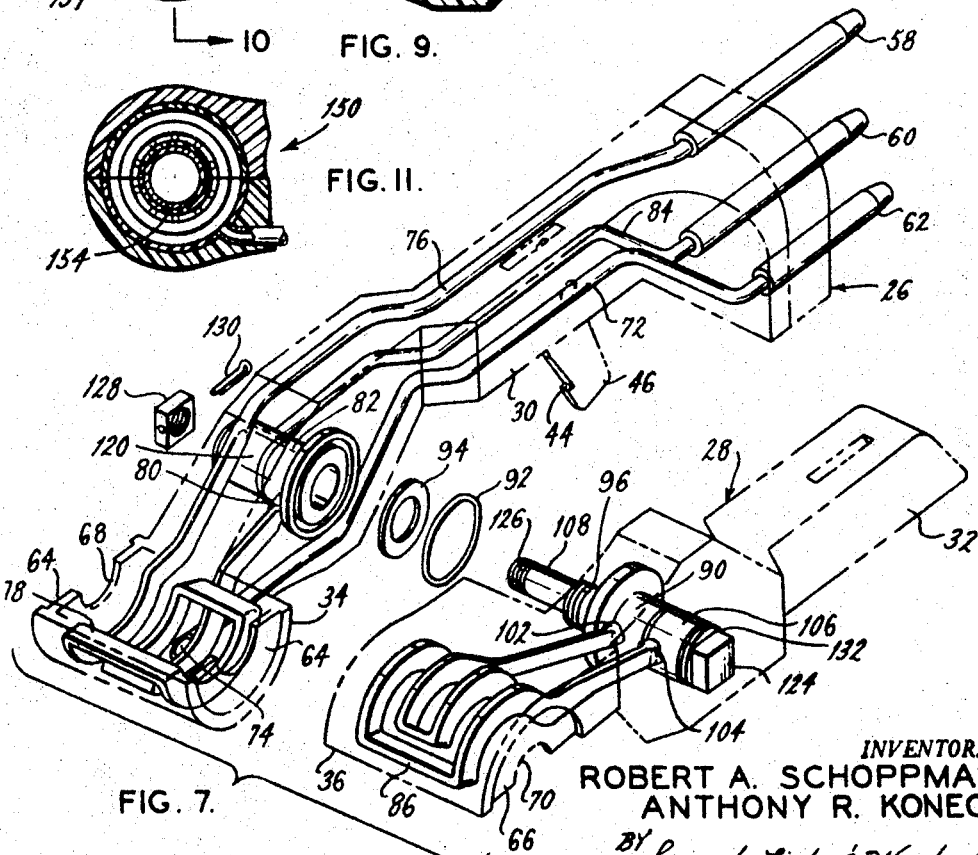
INVENTORS
ROBERT A. SCHOPPMAN
ANTHONY R. KONECNY
ATTORNEYS United States Patent Office 3,268,703
Patented August 23, 1966

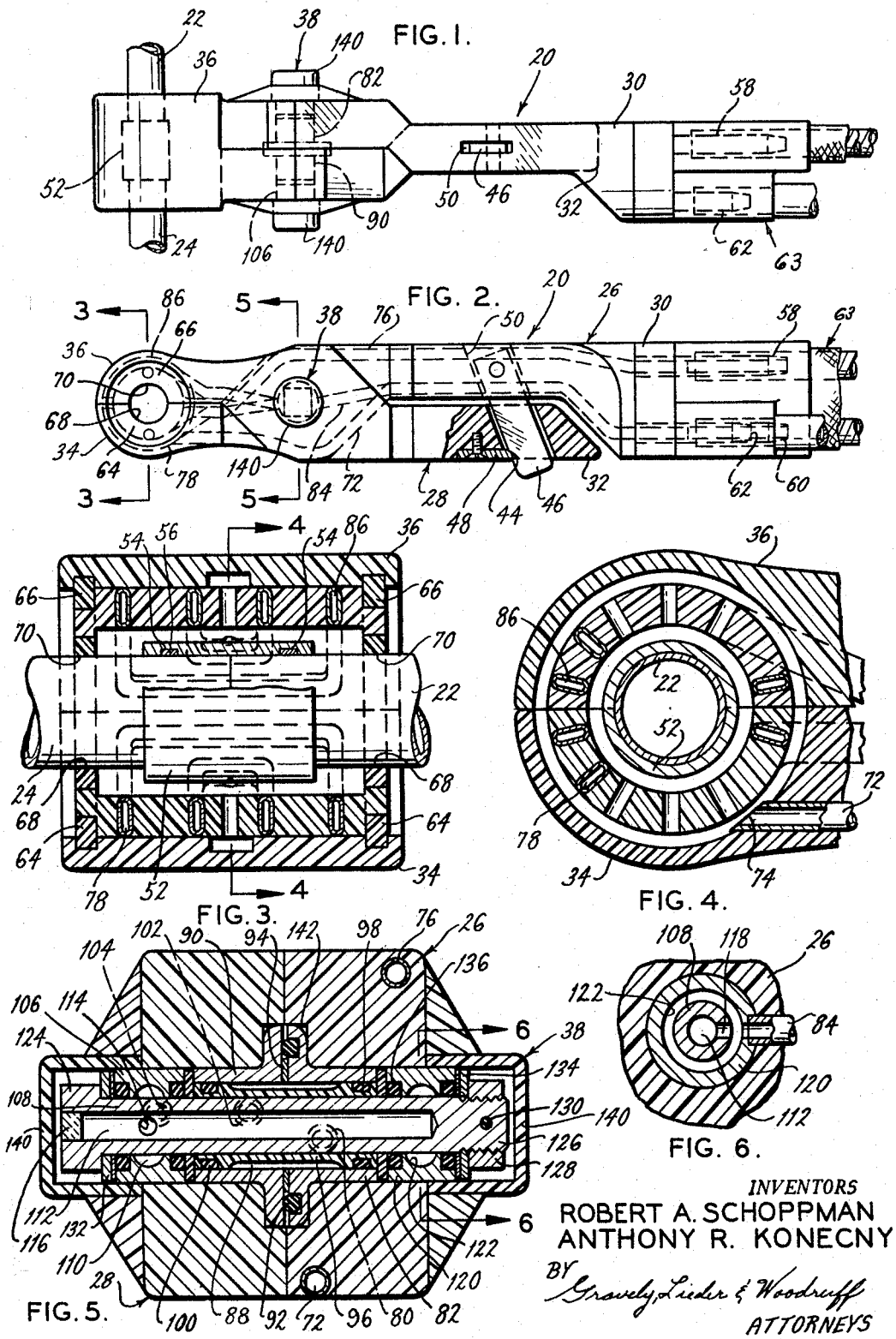

3,268,703
BRAZING TOOL
Robert A. Schoppman, Florissant, Mo., and Anthony R. Konecny, Boulder, Colo., assignors to Aeroquip Corporation, Jackson, Mich.
Continuation of abandoned application Ser. No. 231,984, Oct. 22, 1962. This application Dec. 23, 1965, Ser. No. 520,033
15 Claims. (Cl. 219—9.5)

This application is a continuation of application Serial No. 231,984, filed October 22, 1962, now abandoned.

The present invention relates generally to brazing and debrazing tools and the like and more particularly to compact, portable hand tools for induction brazing together members such as the ends of tubular members or pipes and for debrazing the same.

Many brazing and debrazing devices and tools have been devised and constructed but so far as known no one heretofore has devised a simple hand tool which is particularly adaptable for use in close quarters, and which can be used to induction braze together and debraze members such as pipe ends and the like. Furthermore, all known brazing means and methods have required relatively cumbersome, complicated and expensive equipment, and the known equipment has been relatively difficult to operate and totally unsuitable for use at work sites especially where the working quarters and the access thereto are limited.

The present invention teaches the construction and operation of a relatively simple tool which overcomes these and other disadvantages of known means and methods of brazing. The present tool comprises a pair of members having cooperating handle portions and cooperating clamp portions for engaging the work to be brazed, means hingedly connecting said members, said clamp portions including means adapted when clamped on a work piece to form a chamber surrounding the work, means for filling the chamber with an inert atmosphere, a heating element formed of tubular members positioned in said chamber adjacent to the work, means connecting said heating element to a source of electric energy and to a source of cooling fluid, said last named means including conductor means and passage forming means in the hinge connection means between said pair of members. The subject tool also includes means for maintaining the hingedly connected members in clamped condition on the work.

It is a main object of the present invention to provide a relatively inexpensive, easy to operate, compact, portable tool for brazing and the like.

Another object is to provide improved brazing means.

Another object is to provide a relatively simple hand tool for brazing together pipe ends and other similar devices.

Another object is to provide a brazing tool that can be operated in relatively restricted quarters.

Another object is to provide means for making improved connections between pipe ends and similar members.

Another object is to provide a brazing tool that can be operated by relatively unskilled persons.

Another object is to provide a tool having the above objects and advantages and which can also be used for debrazing and breaking loose joints and the like.

These and other objects and advantages of the present invention will become apparent after considering this specification and the accompanying drawings, wherein:

FIG. 1 is a top plan view of a brazing tool constructed according to the present invention;

FIG. 2 is a side elevational view of the subject tool;

FIG. 3 is an enlarged cross-sectional view taken on line 3—3 of FIG. 2;

FIG. 4 is an enlarged fragmentary cross-sectional view taken on line 4—4 of FIG. 3;

FIG. 5 is an enlarged cross-sectional view taken on line 5—5 of FIG. 2;

FIG. 6 is an enlarged fragmentary cross-sectional view taken on line 6—6 of FIG. 5;

FIG. 7 is an exploded perspective view of the subject tool with the casing portions thereof shown in phantom outline;

FIG. 8 is a fragmentary top view of the operating end portion of a modified form of the subject tool;

FIG. 9 is a fragmentary cross-sectional view taken on line 9—9 of FIG. 8;

FIG. 10 is a cross-sectional view taken on line 10—10 of FIG. 9; and

FIG. 11 is a fragmentary cross-sectional view taken on line 11—11 of FIG. 8.

Referring to the drawings by reference numbers, the number 20 generally identifies a brazing tool constructed according to the present invention. The embodiment of the tool 20 illustrated and described herein is constructed for brazing together adjacent ends of tubular members such as the pipes 22 and 24. Other forms and shapes of the subject tool, however, can be constructed and used in the same or similar manner, and it is not intended to limit the invention to the disclosed embodiment.

The tool 20 has two hingedly connected members 26 and 28 each of which has a handle portion 30 and 32 respectively and a clamp portion 34 and 36 respectively. The members 26 and 28 are pivotally connected together by a hinge 38 which will be described more in detail hereinafter. The clamp portions 34 and 36 are shown in FIGS. 1 and 3 clamped around adjacent ends of two tubular pipe members 22 and 24 for connecting the adjacent ends thereof by brazing. In order to clamp the tool on the pipe ends the handle portions 30 and 32 open like scissors and the pipe ends are received in the space between the clamp portions 34 and 36. With the pipe ends positioned between the clamp portions, the handles 30 and 32 are moved together to the positions illustrated in FIG. 2. In this position a catch 44 on latch member 46 engages a cooperating member 48 carried on the member 28 to lock the tool in closed condition. The latch member 46 is pivotally positioned in a passage 50 in the member 26.

Before the tool 20 is clamped on the pipe ends, however, a tubular sleeve 52 is positioned on the pipe ends as shown in FIGS. 1, 3 and 4. The sleeve 52 has two or more annular internal grooves 54, and in each groove is positioned a ring of brazing alloy 56 which is in contact with one of the pipes 22 and 24. The tool 20 is constructed to melt the rings 56 and thereby braze (or debraze) the sleeve to the pipes. The subject tool is also designed to perform the melting and brazing in the presence of an inert environment to prevent oxidation and to produce a leak proof connection between the pipes. The tool for performing the brazing includes heating and cooling means and means for introducing inert gas all of which will be described in detail.

Referring to FIG. 7 it will be seen that the member 26 has three tubular connectors 58, 60 and 62 which are designed to plug into a suitable cable 63 as shown in FIGS. 1 and 2. The same cable can then be used with other similar tools designed to operate on different sized pipes. The connectors 58 and 60 are adapted to be connected to a source of high frequency electrical energy (not shown) and also to a source of cooling fluid (not shown) which is circulated therethrough. The connector 62 is adapted to be connected to a source of inert gas.

The clamp portions 34 and 36 include semi-cylindrical portions of hollow construction which close about the pipes 22 and 24 to be connected or disconnected and the sleeve 52 to form a cylindrical chamber therearound. The portions 34 and 36 also have end walls 64 and 66 respectively with semi-circular cutouts 68 and 70, respectively, which receive the pipes when the tool is clamped. The connector 62 for inert gas is connected to the chamber formed by the members 34 and 36 by a conduit member 72 which extends substantially the full length of the member 26 and has an open end 74 which communicates with the chamber formed by the clamp portions 34 and 36. By having the connector 62 connected to a source of inert gas the chamber surrounding the pipe ends is maintained with an inert environment to prevent oxidation of the parts during brazing and cooling of the parts after brazing. A suitable fit is maintained between end walls 64 and 66 and tubing surfaces 22 and 24 to allow escape of air displaced by the inert gas.

The connector 58 (FIG. 7) is connected to a tubular conductor 76 which also extends through the member 26. The conductor 76 is shown flattened adjacent the clamp end of the tool and is formed into a heating element 78 which has a semi-tubular shape and is adapted to be positioned adjacent to and around part of the sleeve 52. The opposite end of the conductor 76 from the connector 58 is identified by number 80 and is sealably connected to a tubular member 82 which is part of the hinge 38. As previously stated the hinge 38 forms an electrical and fluid connection between the tubular member 76 which forms the heating element 78, another tubular member 84, and another heating element 86. The heating element 86 is positioned in the clamp portion 36 and is similar in shape to the heating element 78. The details of the hinge 38 are shown in FIGS. 5 and 7.

In FIG. 5 the conductor end 80 is shown in dotted outline connected to the member 82. This connection establishes electrical communication with member 82 and fluid communication with an elongated annular groove 88 defined between the member 82, a similar member 90 sealed thereto by an O ring 92, a metal spacer 94 positioned between the member 82 and 90, and a tubular non-conducting member 96 which extends through the members 82 and 90 and is sealed thereto by O rings 98 and 100.

The heating element 86 has one end 102 (FIG. 5) connected to the member 90 and is therefore in electrical and fluid communication with the heating element 78. The electrical connection is through the members 82, 94 and 90, and the fluid communication is through the annular groove 88.

The heating element 86 has another end 104 which is connected to an annular conductor member 106. The member 106 is also part of the hinge 38 and is mounted on a tubular pin member 108 that extends substantially the full length of the hinge 38. The member 106 has an annular groove 110 which communicates with a bore 112 in the pin member 108 through a port 114. The bore 112 is plugged at the end by a plug 116 and the opposite end of the pin 108 has another port 118 (FIG. 6) located on the opposite side thereof from the port 114. Another annular member 120 similar to the member 106 is positioned on the pin 108 at this location and has an annular inside groove 122 which communicates with the port 118. The tubular conductor 84 has one of its ends connected to the member 120 to provide a return for the electrical and fluid connections to the connector 60.

The pin 108 has a head portion 124 on one end and a threaded portion 126 on the opposite end. The threaded portion 126 receives a nut 128 which holds the parts of the hinge together. The pin 108 and the nut 128 also have cooperating cross bores which receive a cotter pin 130 or the like. Suitable spacers or washers 132 and 134 are also provided on the hinge for bearing purposes, and the annular members 106 and 120 are provided with O rings 136 to prevent escape of the cooling fluid. Insulator closure members 140 are also provided around the ends of the hinge 38.

It will be noted in FIG. 5 that the members 82 and 90 have adjacent outwardly extending portions which are positioned in an annular space 142 formed by the members 26 and 28. When the members 26 and 28 are moved relative to each other as when the tool is being opened or closed the electrical and fluid circuits through the heating elements 78 and 86 are maintained.

The tool 20 is plugged into a suitable power and coolant supply cable assembly 63 through connectors 58, 60 and 62. The tool 20 operates by being clamped onto the member to be brazed or debrazed and locked in this position. The cable assembly is preferably flexible making the tool and cable assembly easy to manipulate. It is also contemplated to first clamp the tool to the work and then connect the cable assembly 63 to the tool. The cable has means therein for connecting the connectors 58 and 60 to a source of electric energy and also to a source of cooling fluid, and other means for connecting the connector 62 to a source of inert gas. A switch control or timer device, not shown, may also be provided in the electrical circuit for energizing and deenergizing the heater elements 78 and 86, and suitable means such as solenoid valves can be used to control the flow of coolant and inert gas. The heater elements 78 and 86 are constructed of tubular conducting material and they produce heat of desired temperature in the work pieces by induction when energized by a high frequency alternating current. During the time that the heating elements are energized the connector 62 supplies inert gas to the chamber formed by the clamp portions 34 and 36 to displace the air contained therein to prevent oxidation of the members and to provide cooling of the work pieces after brazing. It should also be noted that during the brazing operation liquid coolant is circulated through all conducting details of the tool including the heating elements, and the brazing alloy as well as the pipe ends and sleeve are all heated by induction. This is important to assure a good connection between the members being brazed.

The connectors 58, 60 and 62 are accurately located on the rear end of the member 26 so as to plug into a suitable cable assembly. Other similar tools of different sizes and shapes to accommodate different parts also have similarly located connectors, and can therefore also be used with the same or with a similar cable. This is important because it increases the versatility of the subject tool and makes possible wider application without a substantial additional expense or space requirement for tool storage.

The tool 20 as shown and described is designed specifically for brazing together the ends of two aligned pipes or for breaking a braze connection therebetween. Obviously, however, there are many forms of connections that can be made or broken by tools of the same or similar construction and using the same operation. For example, a modified form of the tool 20 can be used to connect or disconnect different fittings such as a T, a cross, and an elbow fitting to a pipe. One such modified tool 150 is shown in FIGS. 8–11.

The modified tool 150 is shown positioned for brazing or debrazing one end of a connector 152, such as a T connector or elbow to a pipe 154. The connector 152 has an inside diameter to fit the outside diameter of the pipe 154. The modified tool 150 makes a suitable fit with the members to be brazed to allow escape of air displaced by the inert gas, for example, between the tool end wall 156 and connector 152. Joint or system internal cleanliness may be further maintained by flowing inert gas through the system being brazed. In this particular application the connector 152 has one internal groove filled with brazing alloy that is positioned adjacent to the outer surface of the pipe 154. The tool 150 is similar in construction and operation to the tool 20 except that the shape of the clamp ends and the heating elements are modified to accommodate the different shape of the parts to be connected. It is therefore not deemed necessary to describe in detail the structure of the modified tool.

Many other variations and modifications of the subject tool will also become apparent after considering this specification and the accompanying drawings.

Thus there has been shown and described a novel brazing tool which fulfills all of the objects and advantages sought therefor. As already noted, however, many changes, modifications, variations and other uses of the subject tool will become apparent to those skilled in the art after considering this specification and the accompanying drawings. All such changes, modifications, variations and other uses which do not depart from the spirit and scope of the invention are deemed covered by the invention which is limited only by the claims which follow.

What is claimed is:

1. A brazing and debrazing tool comprising a pair of members each having a handle portion formed on one end and a clamp portion formed on an opposite end, said clamp portions being adapted to mate cooperatively to form a chamber around an object to be brazed, a hinge connection between said members, a heating element positioned in the chamber formed by the clamp portions adjacent to the object being brazed, said heating element including a tubular member of circuitous form, and conduit means connecting said heating element to a source of electricity and to a source of cooling fluid, said conduit means including tubular conductor means in one of said handle portions, and passage forming conductor means through the hinge connection between said members.

2. The brazing tool defined in claim 1 including conduit means in one of said members connected to said chamber, and means connecting said conduit means to a source of inert gas.

3. A portable tool used for uniting members having a body of brazing alloy positioned therebetween comprising a pair of members having hinge connection means therebetween, each of said members having a clamp portion on one end which mates with the clamp portion on the corresponding end of the other member and with the members to be united to form a chamber surrounding portions of said members to be united in the area of the body of brazing alloy, an electric heating element positioned in each of said clamp portions to heat the surrounded portions of the members to be united, said heating elements being constructed of tubular conductor material shaped to be able to distribute heat by induction over the surrounded portions of said members to be united, tubular conductor and passage forming means including said hinge connection means between said pair of members for connecting said heating elements together and to a source of high frequency electrical energy, said tubular conductor and passage means also being connected to a source of cooling fluid, and conduit means connecting said chamber to a source of inert gas.

4. The portable tool defined in claim 3 wherein said tubular conductor means and said conduit means include flexible cable means.

5. A tool for joining tubular members by brazing a tubular union therebetween, said union being of a size and shape to slidably cooperate with end portions of the tubular members to be joined, and a body of brazing material positioned between said union and each of said end portions of the tubular members comprising a pair of members each having a handle portion on one end and a clamp portion on an opposite end, said clamp portions including means engageable with the tubular members on opposite sides of the union to form a chamber that surrounds the union, a hinge connection between said pair of members whereby the said handle portions can be operated to open or close the clamp portions, an electric heating element formed of tubular material positioned in each of said clamp portions, and means connecting said heating elements together and to a source of electric energy, said last named means including tubular conductor means and relatively movable conductor members in the hinge connection.

6. The tool defined in claim 5 including latch means, on one of said handle portions engageable with the other handle portion to maintain the clamp portions in clamped position engaged with the tubular members.

7. The tool defined in claim 5 wherein said hinge connection includes means establishing fluid flow communication through the heating elements and through the tubular conductor means, and means connecting said tubular conductor means to a source of cooling fluid.

8. The tool defined in claim 5 wherein conduit means are connected to the chamber that surrounds the union, and means connecting said conduit means to a source of inert gas.

9. Means for brazing a pair of members in an inert atmosphere and having a brazing material positioned therebetween, comprising a first operator member having a first handle portion on one end and a first clamp portion on an opposite end, a first heating element formed of tubular material positioned in said first clamp portion, tubular conductor means connected to said first heating element and extending through said first operator member, a second operator member having a handle portion positioned to operate cooperatively with the first handle portion, a second clamp portion on said second operator member positioned to cooperate with the first clamp portion and with the members to be united, said cooperating clamp portions including means forming a chamber adapted to surround the members to be united in the area of the body of brazing material, a second heating element formed of tubular conductor material positioned in said second clamp portion, said first and second heating elements having a combined shape to surround the members to be united, hinge connection means connecting said first and second operator members, said connection means including relatively movable conductor means and passage forming means connected between said first and second heating elements means connecting said tubular conductor means to a source of electric energy, means for circulating a coolant through the conductor means, the heating elements and the connecting passage forming means therebetween, and other means connecting the chamber formed by the clamp portions to a source of inert gas.

10. The means for joining members by brazing defined in claim 9 wherein said electrical connection means, said coolant circulating means and said means connecting the chamber to a source of inert gas include a flexible cable having means thereon for releasably connecting one of said operator members thereto.

11. A tool used in the disassembly of brazed connection between members comprising a pair of elements having cooperating clamp portions adapted to be clamped around a brazed connection between members, said clamp portions mating cooperatively when clamped together to form a chamber around the brazed connection, a hinge connecting said pair of elements, a heating element positioned in the chamber formed by the clamp portions adjacent to the brazed connection, said heating element including a tubular member of circuitous form, and conduit means connecting said heating element to a source of electricity and to a source of cooling fluid, said conduit means including tubular conductor means and passage forming conductor means in the hinge connecting said elements.

12. A tool used in the disassembly of brazed connection between members comprising a pair of elements having hinge connection means therebetween, each of said elements having a clamp portion on one end which mates with the clamp portion on the corresponding end of the other element and with the brazed members to form a chamber surrounding the brazed connection between said members, an electric heating element positioned in each of said clamped portions to heat by induction the brazed members in the area of the brazed connection therebetween, said heating elements being constructed of tubular conductor material shaped in a circuitous manner, tubular conductor and passage forming means including said hinge connection means between said pair of elements connecting said heating elements together and to a source of high frequency electrical energy, said tubular conductor and passage means being also connected to a source of cooling fluid for circulation of cooling fluid through the passage forming means and the heating elements.

13. The tool defined in claim 12 wherein said tubular conductor and passage forming means includes a flexible cable assembly connected to the tool.

14. A device for uniting by brazing two members having a brazing material positioned therebetween, said device comprising first and second separable units defining a substantially closed chamber and adapted to surround said members to be united in the area of said brazing material, first and second heating elements carried by said first and second units, respectively, and surrounding said chamber, said first and second heating elements having a tubular construction and each having a plurality of generally semicircular coils, interconnected to provide a continuous current path, means carried by each unit and maintaining said heating elements separated from each other when said units define said heating chamber, means connecting a source of high frequency electrical energy to said heating elements, and means connecting a source of cooling fluid to said heating elements.

15. A device for uniting by brazing two members having a brazing material positioned therebetween, said device comprising first and second separable units defining a substantially closed chamber and adapted to surround said members to be united in the area of said brazing material, first and second heating elements carried by said first and second units, respectively, and surrounding said chamber, said first and second heating elements having a tubular construction and each having four juxtaposed generally semicircular coils so constructed and arranged that the current flow in the adjacent first and second coils is in the same direction and the current flow in the adjacent third and fourth coils is in the same direction, means carried by each unit and maintaining said heating elements separated from each other when said units define said heating chamber, means connecting a source of high frequency elctrical energy to said heating elements, and means connecting a source of cooling fluid to said heating elements.

References Cited by the Examiner

UNITED STATES PATENTS

| | | | |
|---|---|---|---|
| 2,649,527 | 8/1953 | Chapman et al. | 219—7.5 |
| 3,031,554 | 4/1962 | Jackson | 219—9.5 |
| 3,110,793 | 11/1963 | Worthington | 219—9.5 |

RICHARD M. WOOD, *Primary Examiner.*